(12) United States Patent
Jiang et al.

(10) Patent No.: US 11,099,780 B2
(45) Date of Patent: Aug. 24, 2021

(54) ADAPTIVELY TUNING POLLING INTERVALS OF CONTROL HOSTS IN DISTRIBUTED STORAGE SYSTEMS

(71) Applicant: EMC IP Holding Company LLC, Hopkinton, MA (US)

(72) Inventors: Xuedong Jiang, Westford, MA (US); Daryl F. Kinney, Hopkinton, MA (US); John S. Copley, Hopkinton, MA (US); Michael E. Specht, Bolton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 203 days.

(21) Appl. No.: 16/384,412

(22) Filed: Apr. 15, 2019

(65) Prior Publication Data
US 2020/0326882 A1 Oct. 15, 2020

(51) Int. Cl.
G06F 12/00 (2006.01)
G06F 3/06 (2006.01)

(52) U.S. Cl.
CPC .......... *G06F 3/0659* (2013.01); *G06F 3/0604* (2013.01); *G06F 3/067* (2013.01)

(58) Field of Classification Search
None
See application file for complete search history.

(56) References Cited

U.S. PATENT DOCUMENTS 8,589,513 B1 * 11/2013 Tamer ............... G06F 16/27
709/218
9,471,658 B2 * 10/2016 Blea ............... G06F 11/1464

* cited by examiner

*Primary Examiner* — Daniel D Tsui
(74) *Attorney, Agent, or Firm* — Amin, Turocy & Watson, LLP

(57) ABSTRACT

The described technology is generally directed towards adaptively tuning storage systems. According to an embodiment, a system can comprise a processor and computer executable components that can comprise an interval determiner to determine a polling interval based on an estimate of a workload of a shared data store on a data storage array, based on a change activity detected by the system. Further, a host controller can receive transactions from a host application, wherein the transactions perform one or more of updating the local data store, or querying the local data store for results, and a daemon process that, at the polling interval, performs one or more of, polling the data storage array for updates to the local data store based on the shared data store, or updating the shared data store based on the local data store.

20 Claims, 10 Drawing Sheets

US 11,099,780 B2

ADAPTIVELY TUNING POLLING INTERVALS OF CONTROL HOSTS IN DISTRIBUTED STORAGE SYSTEMS

TECHNICAL FIELD

The subject application generally relates to storage systems, and, for example, to tuning data distribution processes, and related embodiments.

BACKGROUND

The consistency of group data among distributed control hosts can be achieved in some circumstances through periodic poll/update scheme, where client systems poll server systems and receive updates at a particular interval. Generally, pre-defined poll/update intervals are selected to try to strike a balance between convergence time and the use of system resources. This scheme can work fine in a relatively static environment where the workload can be estimated when the storage systems are deployed. However, it is common that the workload and the size of the storage system may change significantly after the initial deployment due to changes of business requirements over time.

Pre-defined intervals for accessing repositories can cause significant performance issues if the workload varies significantly, which can happen when in a large environment. To handle the variance an interval is often selected to accommodate the array with the heaviest workload, which can make group data convergence slower than they should be for arrays with lighter workloads.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components can comprise an interval determiner that can determine a polling interval based on an estimate of a workload of a shared data store on a data storage array, based on a change activity detected by the system. The components can further include a host controller to receive transactions from a host application, wherein the transactions perform one or more of updating the local data store, or querying the local data store for results. In addition, a daemon process that can, at the polling interval, performs one or more of: polling the data storage array for updates to the local data store based on the shared data store, or updating the shared data store based on the local data store.

According to another embodiment, a computer-implemented method can comprise updating, by a data storage array comprising a processor, a shared data store, based on an update request received from a management host device; receiving, by the data storage array, a polling request from the management host device, wherein the polling request is received at a polling interval determined by the management host device based on an estimate, by the management host device, of a workload of the shared data store; and responding, by the data storage array, to the polling request.

According to another embodiment, a computer program product is provided. The computer program product can comprise a machine-readable storage medium comprising executable instructions that, when executed by a processor, facilitate performance of operations comprising determining a polling interval based on an estimate of a workload of a shared data store on a data storage array, based on a change activity detected by the system, and receiving transactions from a host application, wherein the transactions perform one or more of updating the local data store, or querying the local data store for results. Further, performing, by a daemon process at the polling interval, one or more of: polling the data storage array for updates to the local data store based on the shared data store, or updating the shared data store based on the local data store.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards maintaining a consistent logical data size with variable protection stripe size in an array of independent disks. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

The computer processing systems, computer-implemented methods, apparatus and/or computer program products described herein employ hardware and/or software to solve problems that are highly technical in nature, that are not abstract and cannot be performed as a set of mental acts by a human. For example, a human, or even a plurality of humans, cannot efficiently, accurately and effectively, handle the communications of host and storage devices, with the same level of accuracy and/or efficiency as the various embodiments described herein.

Figure 1:
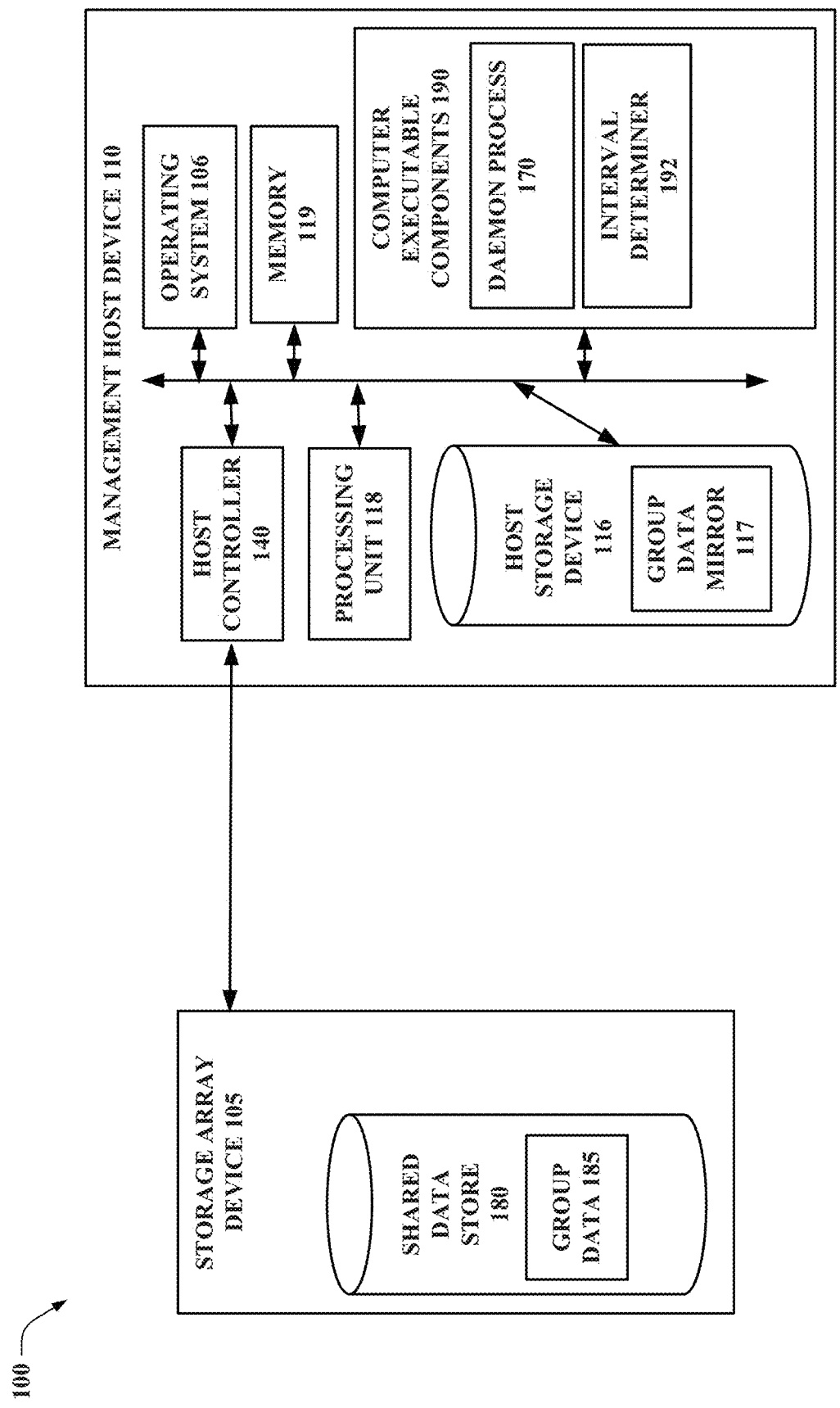
FIG. 1 illustrates a block diagram of an example, non-limiting system that can facilitate adaptively tuning polling intervals of control hosts in distributed storage systems, in accordance with various aspects and implementations of the subject disclosure.

FIG. 1 illustrates a block diagram of an example, non-limiting system 100 that can facilitate adaptively tuning polling intervals of control hosts in distributed storage systems, in accordance with various aspects and implementations of the subject disclosure. Management host device 110 as depicted includes operating system 106, such as a Linux®-based operating system, which can manage computer executable components 190, and host controller 140.

In one or more embodiments, system 100 can be a group name service system, that can include a storage array device 105 to provide persistent and global storage for group data 185 across multiple management host devices 110. In one or more embodiment, group data can be stored in a distributed fashion on one or more host management devices 110. When a host management device 110 belongs to a group, group data for that group can be stored in host storage device 116 as group data mirror 117.

In one or more embodiments, host applications (not shown) can be communicatively coupled to host management device 110, and utilize group data mirror 117 stored in host storage device 116, e.g., reading, adding to, removing, and updating the group data. In one or more embodiments, changes to the group data changes made by host applications can be distributed to other members of the group (e.g., other host management devices 110) by periodically accessing shared data store 180 on an array hosted repository (e.g., storage array device 105). This periodic access of shared data store 180 can also facilitate the update of host storage device 116 to include changes to the group data by other management host devices 110 of the group. Management host device 110 can further include host controller 140 that can receive transactions from a host application, and the transactions can perform one or more of updating the local data store, or querying the local data store for results.

According to one or more embodiments, processing unit 118 can comprise one or more types of processors and/or electronic circuitry that can implement one or more computer and/or machine readable, writable, and/or executable components and/or instructions that can be stored in memory 119. For example, processing unit 118 can perform various operations that can be specified by such computer and/or machine readable, writable, and/or executable components and/or instructions including, but not limited to, logic, control, input/output (I/O), arithmetic, and/or the like. In some embodiments, processing unit 118 can comprise one or more central processing unit, multi-core processor, microprocessor, dual microprocessors, microcontroller, System on a Chip (SOC), array processor, vector processor, and/or another type of processor. Further examples of processing unit 118 are described below with reference to processing unit 1014 and FIG. 10. Such examples of processing unit 118 can be employed to implement any embodiments of the subject disclosure.

In one or more embodiments, system can comprise memory 119 that can store computer executable components and processing unit 118 that can execute the computer executable components stored in the memory. The computer executable components can comprise interval determiner 192 that can determine a polling interval based on an estimate of a workload of a shared data store on a data storage array, based on a change activity detected by the system. Computer-executable components can further include a daemon process 170 that, at the polling interval, can perform one or more of: polling the data storage array for updates to the local data store based on the shared data store, or updating the shared data store based on the local data store.

As discussed further below with FIG. 10, in some embodiments, memory 119 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 119 are described below with reference to system memory 1016 and FIG. 10. Such examples of memory 119 can be employed to implement any embodiments of the subject disclosure.

According to multiple embodiments, processing unit 118 can comprise one or more types of processors and/or electronic circuitry that can implement one or more computer and/or machine readable, writable, and/or executable components and/or instructions that can be stored on memory 119. For example, processing unit 118 can perform various operations that can be specified by such computer and/or machine readable, writable, and/or executable components and/or instructions including, but not limited to, logic, control, input/output (I/O), arithmetic, and/or the like.

In one or more embodiments, groups can be used to manage various data protection technologies, e.g. remote data facility (RDF) consistency groups among a set of interconnected storage array devices in multiple data centers. Group definitions can be distributed, e.g., stored on multiple storage arrays where each array holds the portion of the definition that is meaningful to that array. Example storage array devices that can be used by one or more embodiments include, but are not limited to, PowerMax®/VMAX® Arrays provided by DELL EMC.

With respect to the updating of group data mirrors 117 among storage array devices 105 and management host devices 110, daemon process 170 can be used by one or more embodiments to manage the updating of data among the group to promote high performance and efficiency, e.g., updates occurring too frequently can reduce system performance and not frequently enough risks inconsistencies among the devices storing the group data mirrors 117.

In one or more embodiments, instances of daemon process 170 in management hosts 110 of the group do not have information regarding the settings (e.g., polling interview discussed below) of other daemon processes 170 of the group, e.g., these components can have access to data corresponding to local conditions at the management host device 110. Example conditions that can be used by one or more embodiments of interval determiner 192 include, but are not limited to, a number host applications submitting transactions (e.g., requesting data, updating data, adding data), errors that occur when communicating with shared data store, and the time it takes for storage array devices 105 to respond to transactions submitted to the storage array devices 105. As described further below, in one or more embodiments, these measurements can be indicators of the frequency with which group data is being updated at one or both of group data mirror 117 and group data 185 at shared data store 180.

Figure 2:
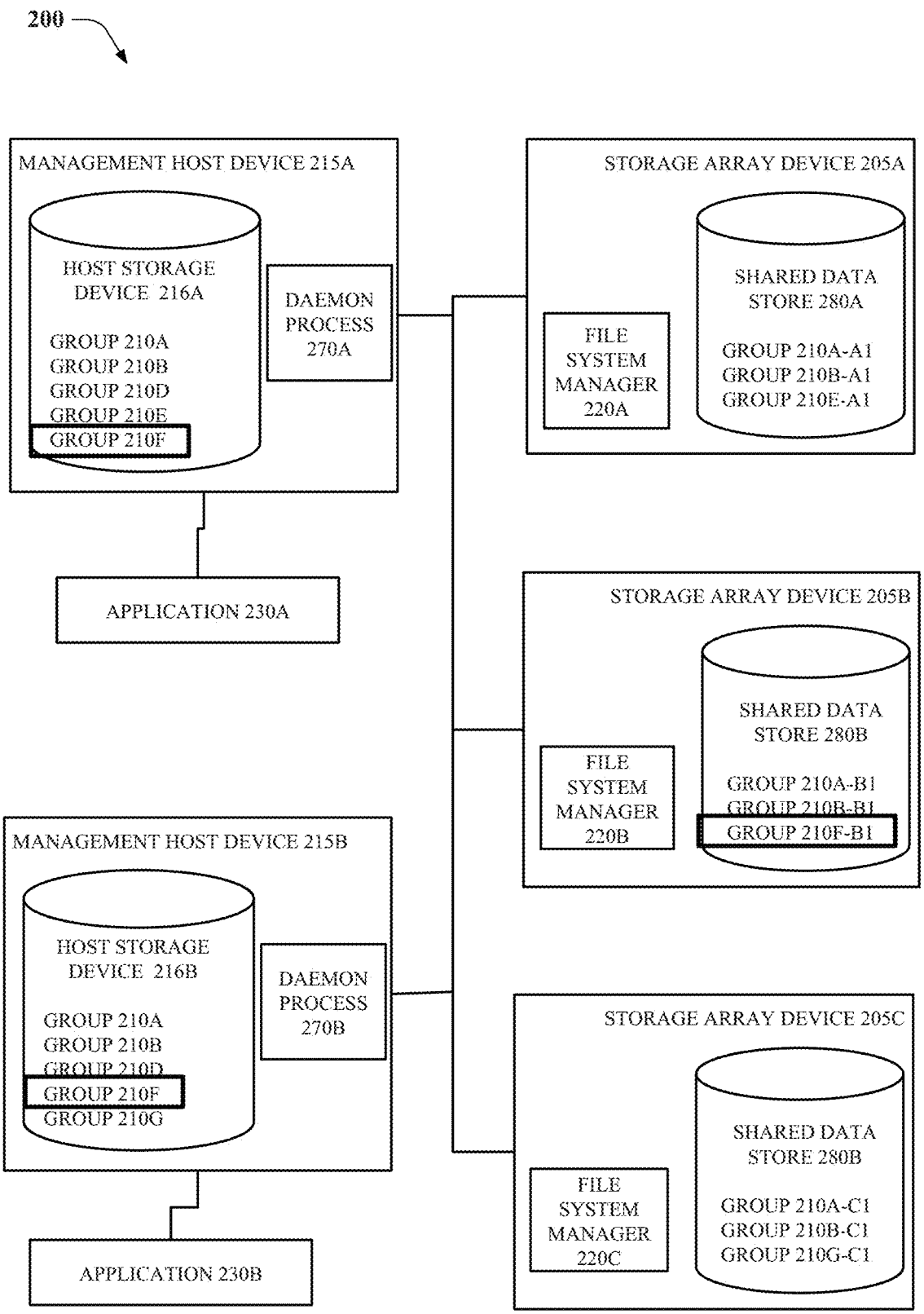
FIG. 2 depicts a non-limiting example of a system that can facilitate having group data shared among management host devices by storage array devices, in accordance with one or more embodiments.

FIG. 2 depicts a non-limiting example of a system 200 that can facilitate having group data 185 shared among management host devices 215A-B by storage array devices 205A-C, in accordance with one or more embodiments. For purposes of brevity, description of like elements and/or processes employed in other embodiments is omitted.

In this example, system 200 can include management host devices 215A-B, with the host devices 215A-B respectively including host storage devices 216A-B. Applications 230A-B are respectively depicted as coupled to management host devices 215A-B, and can access and manipulate data from one or more of groups 210A-B.

In system 200, two or more of management hosts 215A-B and storage array devices 205A-C can be members of seven groups 210A-G of data. As depicted, in one or more embodiments, not all of the devices are members of all the groups, e.g., management host devices 215A-B are a member of group 210F but only storage array device 205B is also a member of this group, and holds group 210F-B1 data in shared data store 280B.

Management host devices 215A-B can include daemon process 270A-B respectively and, it is important to note, only polls storage array devices 205A-C that are a member of a group for updates to the data of that group, e.g., management host devices 215A-B only poll storage array 205B for updates to group 210F data. Similarly, when group 210F data is updated on storage array device 205B, only management host devices 215A-B receive the updates. Applications 230A-B, in one or more embodiments, are not members of groups, rather, based on system 200 functions, applications 230A-B are permitted to read and make updates to the data of certain groups 210A-G. In one or more embodiments, to determine the definitions of groups (e.g., the type of data, management host device members, and other similar characteristics), applications 230A-B can query management host devices 215A-B, e.g., daemon process 170. As discussed further below, one or more embodiments can use a file system manager 220A-B and the application programming interface (API) of the file system can be used to query for group definitions. An example file system that can be used by one or more embodiments include, but is not limited to, the Symmetrix® File System (SFS) provided by DELL EMC, and the API for this file system that can be used to determine group information is SYMAPI.

In one or more embodiments, each of the one or more devices belonging to a group may all be on the same data storage system, (e.g., the Symmetrix data storage system noted above). Alternatively, the devices included in a single group may span multiple data storage systems. A group name may be used in connection with performing any one or more of a variety of operations. The group name may be used, for example, to reference all of the devices in connection with a group and perform an operation or command in connection with all the group's devices. As an example, a group name may be used in connection with issuing a command to split off copies of data maintained consistently across devices included in a group such as in connection with disaster recovery procedures, and the like. Another example is an operation or command that may reference a group for disabling I/O operations to all devices within a particular group.

As noted above, daemon processes 270A-B can facilitate the updating of the data of groups 210A-G. In one or more embodiments, daemon processes 270A-B don't communicate directly with other management host devices 215A-B, rather connections with storage array devices 205A-C can be used to receive and provide updates to groups 210A-G data. In additional or alternative features, management host devices 215A-B can supplement communication with storage array devices 205A-C with direct communication with other management host devices 215A-B.

As discussed further below with FIGS. 3-4, in one or more embodiments, daemons processes 270A-B can recognize changes made to group data made by other management hosts 215A-B by periodically polling storage array devices 205A-B in the background, determine if anything changed and, if so, update the group data stored locally, e.g., in host storage devices 216A-B. Triggers that can cause polling to occur in one or more embodiments are discussed below.

Figure 3:
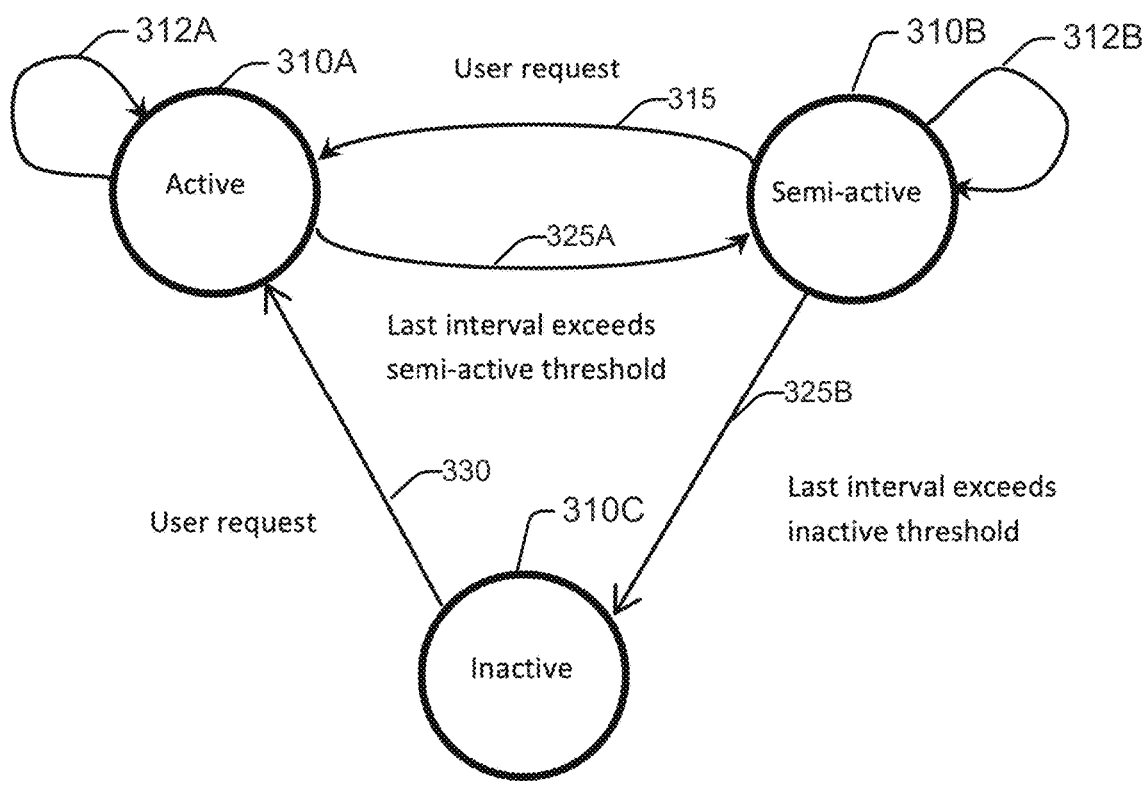
FIG. 3 depicts a flow diagram of an approach to adjust the polling interval based on detected change activities in the system, in accordance with one or more embodiments.

FIG. 3 depicts a flow diagram of an approach to adjust the polling interval based on detected change activities in the system, in accordance with one or more embodiments. For purposes of brevity, description of like elements and/or processes employed in other embodiments is omitted.

In one or more embodiments, the poll/update interval of data interchange in system 200 can be adjusted based on different factors, including, but not limited to, as described below, application activity to access data stored on management host 215A-B. In addition, the poll/update interval can be adjusted, in one or more embodiments, based on the time is takes for updates to be completed at storage array devices 205A-B, as well as the occurrence of errors while the updates are performed.

In one or more embodiments and in some circumstances, when management host devices 215A-B do not receive requests for data from applications 230A-B for a relatively long duration, there can be less of a requirement for daemon process 270A-B to provide updates to storage array devices 205A, e.g., the data in host storage device 216A-B is less likely to have changed.

One approach that can be used by one or more embodiments of daemon process 270A-B to monitor the user activity is described below. In this example, a user request can be a sequence of events happen over time, and a running average of the inter-arrival time of user requests, $A_{avg}^j$, can be used as a measure of user activity, thus being updated as follows:

$$A_{avg}^j = (1-\mu)*A_{avg}^{j-1} + \mu*A_{last} \quad (1)$$

where $\mu$ is a parameter between 0 and 1, $A_{avg}^{j-1}$ is the average value for the previous interval, $A_{last}$ is the last inter-arrival time of user requests. The value of $\mu$ decides how much weights are assigned to the latest inter-arrival time and the history respectively. $A_{avg}^0$ is the initial interval which can be set to some non-zero value.

Based on the above approach, states 310A-C can be used to represent different levels of user activity, these including, but not limited to active 310A, semi-active 320B, and inactive 330C, where active 310A state has the highest level of user activity, semi-active 320B state has lower user activity and inactive 330C state can indicate no user activity. One or more embodiments can transition to the next lower level when the measured user activity drops below the next lower threshold. Similarly, one or more embodiments can transition to the next higher level when the measured user activity rises above the next higher threshold or upon new user requests. By grouping together a range of user activity levels in this fashion, one or more embodiments can maintain a level of responsiveness to user activity level changes, while reducing the amount of overhead required.

In an example implementation of this approach, daemon process 270A-B can start in an active 310A state, and can update the running average of the inter-arrival time of user requests $(A_{avg}^j)$ every time a user request is received. If the latest average inter-arrival time $A_{avg}^j$ is below the semi-active threshold $T_{semi}$, daemon process 270A-B can stay 312A in the active 310A state. If the latest average inter-arrival time $A_{avg}^j$ exceeds 325A the semi-active threshold $T_{semi}$, daemon process 270A-B can move into the semi-active 310B state. Daemon process 270A-B can stay 312B in the semi-active state 320B if the latest average inter-arrival time $A_{avg}^j$ is below the inactive threshold $T_{inactive}$ but above the semi-active threshold $T_{semi}$. In this example, daemon process 270A-B can move 315 into the active 310A state from the semi-active 320B state upon a user request when $A_{avg}^j$ is below the semi-active threshold $T_{semi}$. If the latest average inter-arrival time $A_{avg}^j$ exceeds 320B the inactive threshold $T_{inactive}$, daemon process 270A-B can move into the inactive 310C state. Daemon process 270A-B can move 330 into the active 310A state from the inactive 310C state upon a user request. In one or more embodiments, when daemon process 270A-B can move into the active 310A state from either the inactive 310C or semi-active 310B state, it can trigger an immediate a poll/update to synchronize with the group information in the storage system, and also triggers a reset of $A_{avg}^j$ which means $A_{avg}^j$ is set to $A_{avg}^0$. Note that, in one or more embodiment, $T_{inactive}$ is usually multiple times larger than $T_{semi}$.

In one or more embodiments, in semi-active 310B state and the active 310A states, the poll/update interval can be adjusted according to, as described with FIG. 4 below, an estimate of the workload of the system determined by daemon process 270.

In an additional feature of one or more embodiments. in the semi-active 310B state, the poll/update interval can be slowed down by applying a damping factor so that the intervals in the semi-active 310B state are much longer than those in the active state 310A. Semi-active 310B state can also be a preparation step before stopping the polling/updating completely in the inactive state 310C. System 200 can move into active state 310A from inactive 310B state upon the arrival of a new user request.

As described in the following section, the interval changes between the initial interval $\hat{I}_0$ and the maximum interval $\hat{I}_{max}$ according to the workload in the active state, and the interval changes between the initial interval $\tilde{I}_0$ and the maximum interval $\tilde{I}_{max}$ according to the workload in the semi-active 310B state. Daemon process 270A-B can use the interval $\hat{I}_0$ to start the poll/update each time it moves into the active state 310B, and can use the interval $\tilde{I}_0$ to start the poll/update each time it can move into the Semi-active state. A more detailed discussion of interval changes between different states is included with FIGS. 4 and 5 below.

In one or more embodiments, when daemon processes of multiple management host devices poll storage array devices, the combined polling actions can place a load on the storage array devices, which can, in some circumstances, result in a slow-down of the processes of the storage array devices. From the point of view of a daemon process, by monitoring how long a polling operation takes to complete, the daemon process can also adjust its polling interval in an attempt to minimize the extent to which separate instances of daemon process are polling the arrays at the same time. By this process, each instance of daemon process 270A-B can separately make a determination of array congestion, and adjust its polling interval based how long its polling operations are taking. It should be noted that the above approach can be performed without the additional overhead of messaging between network members.

This section presents procedures used to dynamically learn the changes in the environment (workload, the number of groups, and the number of hosts etc.) and adjust the poll/update interval accordingly without user supervision or intervention. There is a procedure to detect the congestion or workload changes, a procedure to adjust the poll interval, and a back-off procedure for handling errors.

The detection procedure for the Active and Semi-active states are the same, except that the poll/update starts with an initial interval, $\hat{I}_0$ in the Active state, and $\tilde{I}_0$ in the Semi-active state.

Delayed response in the poll/update indicates an increase of workload in the host, or the network, or the storage array, or a combination of any of them. A running average of the execution time $P_{avg}^j$ is updated for every poll/update cycle as follows:

$$P_{avg}^j = (1-\theta)*P_{avg}^{j-1} + \theta*P_{last} \quad (2)$$

where $\theta$ is a parameter between 0 and 1, $P_{avg}^{j-1}$ is the average value for the previous interval, $P_{last}$ is the duration of the last poll/update cycle. The value of $\theta$ decides how much weight is assigned to the duration of the latest poll/update procedure and the history. The initial execution time $P_{avg}^0$ can be set to some non-zero value. The update procedure of $P_{avg}^j$ is the same in both Active and Semi-active states. $P_{avg}^j$ is not updated in the Inactive state where daemon process 270A-B stops to poll/update.

Congestion in accessing the group data can be indicated based on certain errors occurring, e.g., when daemon processes fail to access the group data from an array hosted repository.

Daemon process 270A-B increases the interval when the poll/update fails because daemon process 270A-B cannot access the group data from an array hosted repository. Upon poll/update failures, the poll/update interval $I_j$ is adjusted using the following formula in the active state:

$$I_j = \min[\alpha * I_{j-1}, \hat{I}_{max}] \quad (3.1)$$

and the following in the Semi-active state $$I_j = \min[\alpha * I_{j-1}, \tilde{I}_{max}] \quad (3.2)$$

where α is a parameter between 1 and 2, and $\hat{I}_{max}$ and $\tilde{I}_{max}$ are the maximum intervals in the Active and Semi-active states respectively. The value of alpha determines how fast the interval is increased. The poll/update interval is multiplicatively increased upon errors.

If no error is detected, the duration of the last poll/update procedure $P_{last}$ is compared to the average duration $P_{avg}^i$ to determine whether there is excessive delay in the last poll/update procedure. If the duration of the last poll/update procedure $P_{last}$ is more than the running average of the poll/update time $P_{avg}^j$, the poll/update interval is adjusted according to the following formula in the Active state:

$$I_j \begin{cases} I_{j-1}, & \frac{P_{last}}{P_{avg}^j} < \delta \\ \min\left[\left(1 + \frac{P_{last}}{P_{avg}^j}\right) * I_{j-1}, \hat{I}_{max}\right], & \text{otherwise} \end{cases} \quad (4.1)$$

and the following in the Semi-active state:

$$I_j \begin{cases} I_{j-1}, & \frac{P_{last}}{P_{avg}^j} < \delta \\ \min\left[\left(1 + \frac{P_{last}}{P_{avg}^j}\right) * I_{j-1}, \tilde{I}_{max}\right], & \text{otherwise} \end{cases} \quad (4.2)$$

where δ is a parameter between 0 and 1, and $\hat{I}_{max}$ and $\tilde{I}_{max}$ are the maximum poll/update intervals in the active and semi-active states respectively. The length of the interval is not changed if no error or excessive delay is detected. δ is a tolerance factor used to absorb slight variations of the execution time.

If the interval is not changed for M consecutive cycles, it is decreased according to the following formula in the Active state:

$$I_j = \max[(1-\beta) * I_{j-1}, \hat{I}_0] \quad (5.1)$$

and the following in the Semi-active state $$I_j = \max[(1-\beta) * I_{j-1}, \tilde{I}_0] \quad (5.2)$$

where β is a parameter between 0 and 1 as long as the current interval $I_j$ is higher than the initial interval of the current state, i.e. $\hat{I}_0$ for the active 310A state and $\tilde{I}_0$ for the semi-active 310B state. The value of β determines how fast the interval is decreased.

Errors may occur each time daemon process 270A-B accesses the group data from an array hosted repository. The occurrence of errors can also be used to adjust the polling interval. If daemon process 270A-B is encountering errors as it does its polling, it can be an indication of contention of some sort and so daemon process 270A-B can adjust its polling interval in an attempt to improve the situation.

Instead of simply reporting errors and expecting user intervention, each instance of daemon process 270A-B can use an exponential back-off procedure to adjust its polling interval based on the errors. This applies to every poll/update cycle.

The initial value of the back-off interval $B_0$, i.e. the duration between two consecutive retrials, is proportional to the current poll/update interval. The back-off interval is changed each time an error is detected before the maximum back-off interval is reached:

$$B_j = \min[2 * B_{j-1}, B_{max}] \quad (6)$$

where $B_{max}$ is the maximum back-off interval allowed for a single operation. This back-off procedure can apply to both active and semi-active states.

Figure 4:
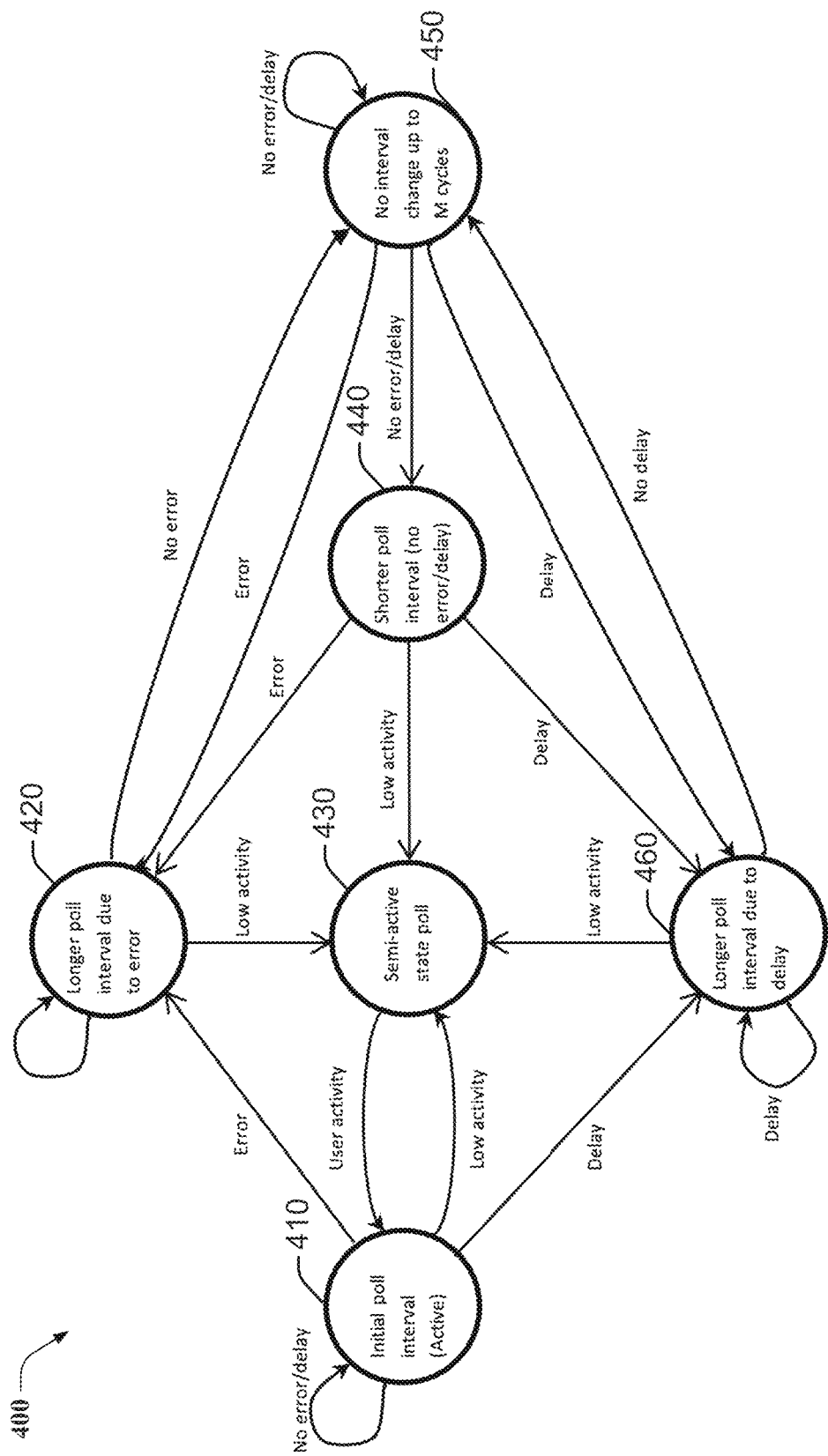
FIG. 4 depicts an example, non-limiting flow diagram of conditions that can change the state of system from an active state to another state, in accordance with one or more embodiments.

FIG. 4 depicts an example, non-limiting flow diagram of conditions that can change the state of system 200 from an active 310A state to another state, in accordance with one or more embodiments. For purposes of brevity, description of like elements and/or processes employed in other embodiments is omitted.

By monitoring and measuring the execution of poll/update operations, on one or more embodiment, daemon process 170 can increase or decrease the poll/update interval when it detects potentially significant changes of the workload of storage array device 205A-C. FIG. 4 provides an example flow diagram of example events.

At block 410 the system is in the active 310A state and operating with an initial poll interval. Three example conditions can cause a change in this state: the occurrence of an error, low user activity, and a delay in the completion of a polling of a storage array device. At block 420, when an error is combined with low user activity, the system can be changed to being in a semi-active 310B state. From this semi-active state, an increase in user activity can cause the system state to return to the active 310A state. Returning to the initial example conditions, when at block 460, a poll interval takes longer than is expected to complete, when combined with low user activity, can cause the state to be changed from active 310A to semi-active 310B.

After the initial polling interval, at block 450, the system can continue at the active 310A state until different conditions occur. For example, after a certain number of cycles without delays or errors, at block 440, the poll interval can be shortened, e.g., because of an estimated lack of storage array device congestion. When delays or errors occur from block 450, the same approaches discussed above with the initial block 410 can be followed, by one or more embodiments.

Figure 5:
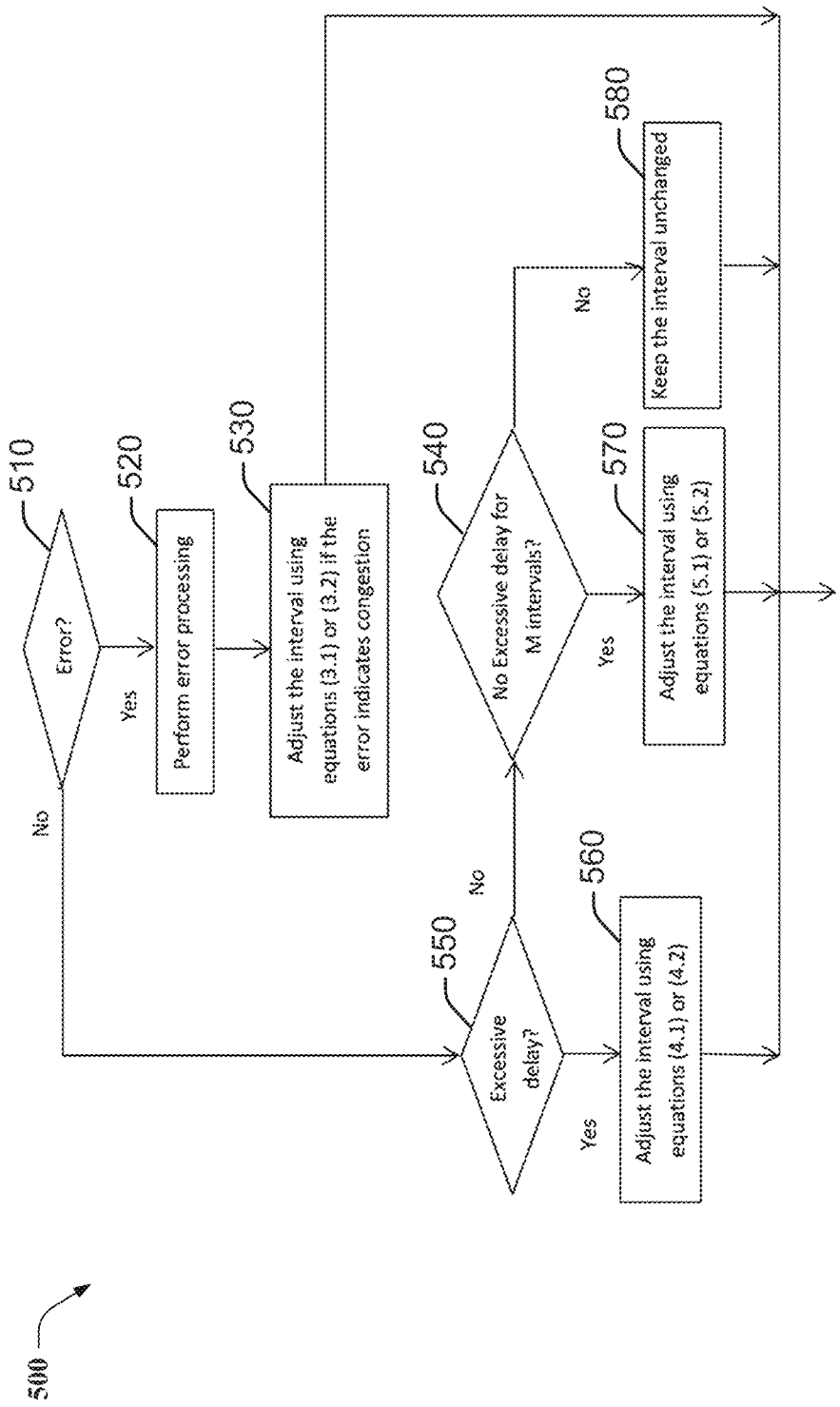
FIG. 5 is an example, non-limiting flow diagram that illustrates operations of one or more embodiments upon trigger conditions, such as errors and delays, in accordance with one or more embodiments.

FIG. 5 is an example, non-limiting flow diagram that illustrates operations of one or more embodiments upon trigger conditions, such as errors and delays, in accordance with one or more embodiments. For purposes of brevity, description of like elements and/or processes employed in other embodiments is omitted.

At block 510 a test for an error occurring is made and, if no error has occurred, at block 550, a test for excessive delay is made. When no delay is detected, at block 540 a count of the number of intervals that have occurred since a delay is made. In one or more embodiments, the number of intervals (M) used as a threshold for lack of delay, can be selected based on a balance between the benefits of adjusting the interval time downward (e.g., more frequent updates can reduce the likelihood of erroneous data being produced), and potential problems that can occur, e.g., an increased likelihood of congestion at storage array device.

In block 570, when there has been no delay for (M) intervals, the interval can be adjusted downward, e.g., by using equations 5.1 or 5.2 discussed with FIG. 3 above. Alternatively, when an excessive delay has occurred within (M) intervals, one or more embodiment can keep the interval the same. Returning to block 550, if an excessive delay is detected after no error is detected, then the polling interval can be increased, e.g., using equations 4.1 or 4.2 above.

Returning to the block 510 check for an error condition, when an error is detected, at block 520 the error can be processed, and at block 530, the interval can be adjusted upward, e.g., by equations 3.1 or 3.2 discussed with FIG. 3 above.

Figure 6:
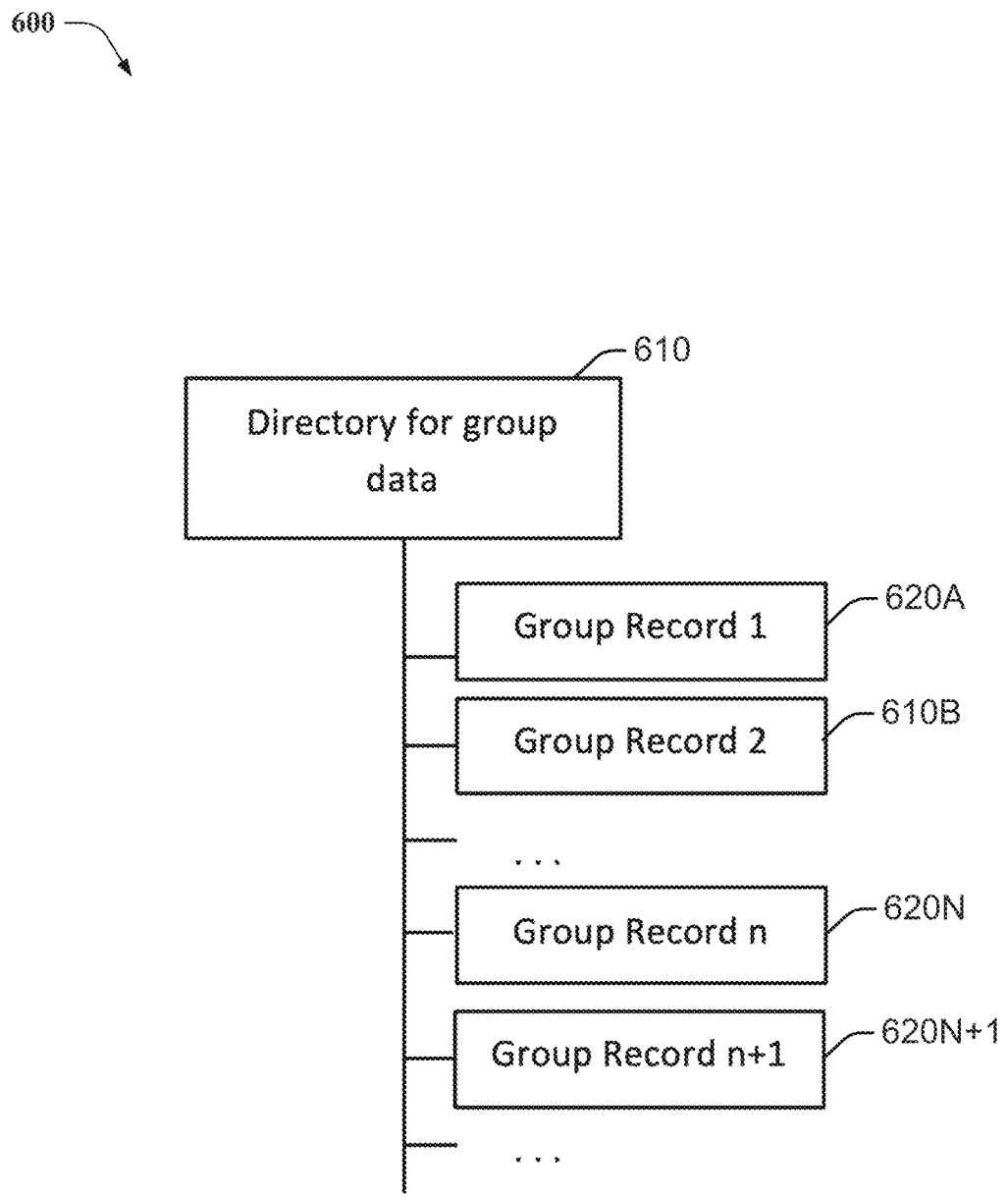
FIG. 6 is an example, non-limiting, hierarchical diagram illustrating the use of a file system to store group data at a storage array device, in accordance with one or more embodiments.

FIG. 6 is an example, non-limiting, hierarchical diagram 600 illustrating the use of a file system to store group data at a storage array device, in accordance with one or more embodiments.

As discussed with FIG. 2 above, in one or more embodiments, a file system can be used as hosted repository for shared data stores 280A-C. In this approach, the group data can be stored in individual files. Using a file system to store the group data has several advantages. For example, file systems (e.g., Symmetrix® File System (SFS) discussed above) can provide buffering and queueing mechanisms that can facilitate higher throughput than using a simple locking mechanism to serialize concurrent access of the group data.

Using a file system, all individual files in a repository can be time stamped, and can be accessed by different processes at the same time. In one or more embodiments, for small files, the atomic read and write mechanism provided, for example by SFS, can eliminate the need to lock individual files for the concurrent access of the file, and for larger files, a copy-and-rename mechanism is introduced to avoid using the file level lock.

In an example of a using SFS, FIG. 6 depicts a hierarchical structure the can be used to store group data, in accordance with one or more embodiments. As depicted, in this example, a directory for group data 610 can be created, e.g., in shared data stores 280A-C. From this directory, using the hierarchical structure of the file system (e.g., SFS) group records 620A-620N+1 can be stored for use by group members.

Figure 7:
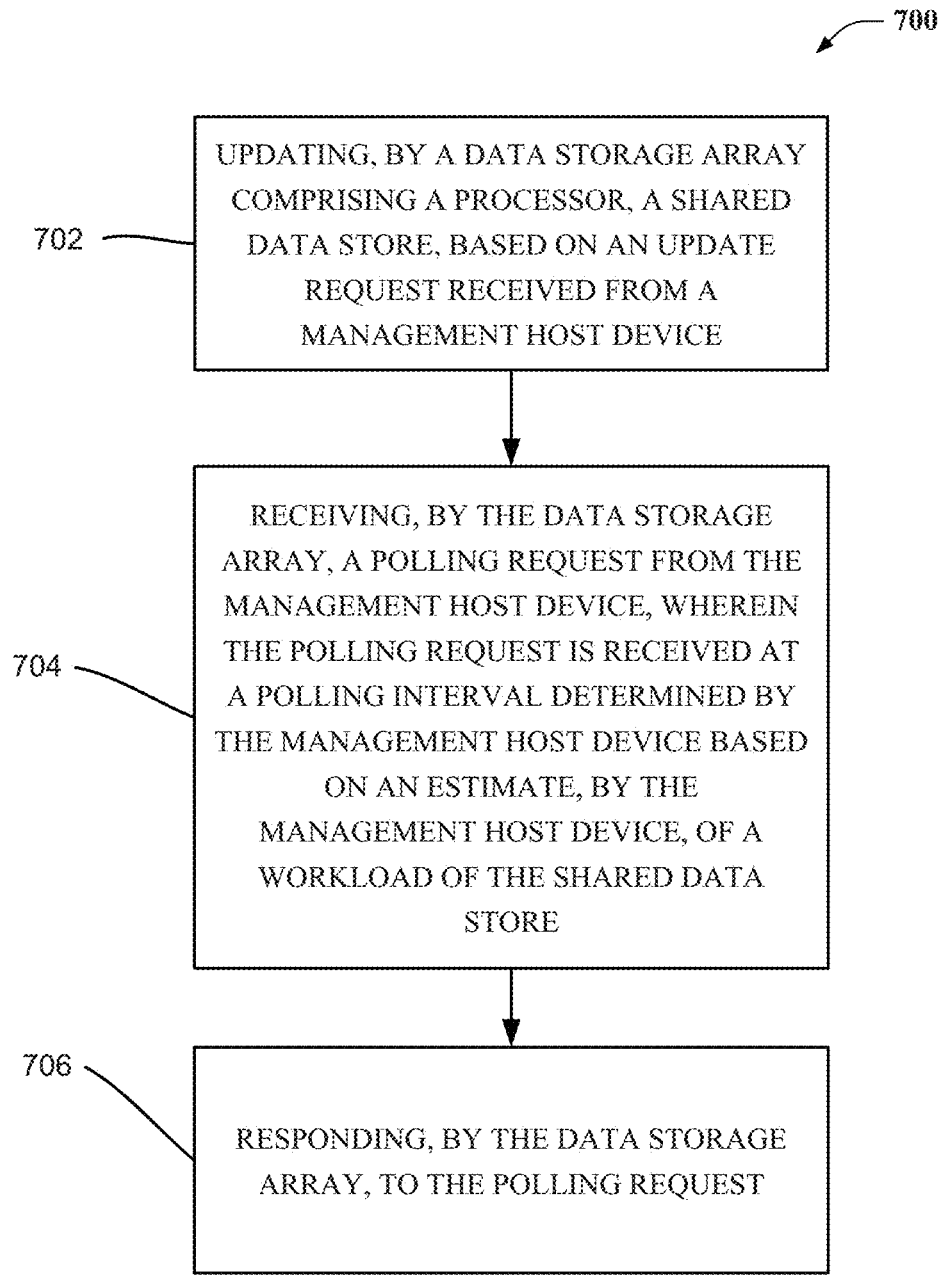
FIG. 7 illustrates an example flow diagram for a method that can facilitate maintaining a consistent logical data size with variable protection stripe size in redundant array of independent disks system, in accordance with one or more embodiments.

FIG. 7 illustrates an example flow diagram for a method 700 that can facilitate maintaining a consistent logical data size with variable protection stripe size in redundant array of independent disks system, in accordance with one or more embodiments. For purposes of brevity, description of like elements and/or processes employed in other embodiments is omitted.

At element 702, method 700 can comprise communicating, by a streaming device (e.g., file streaming component 360) comprising a processor (e.g., processing unit 118), a request to a storage array 330 device, wherein the file is stored, in parts (e.g., 205A-D), on two or more storage devices of the storage array device.

At element 704, the method 700 can further comprise receiving, by the streaming device (e.g., file streaming component 360), from the storage array 330 device based on the request, a first part 205A and a second part 205B of the file, wherein the first part 205A is received from a first storage device of the two or more storage devices and the second part is received from the second storage device of the two or more storage devices.

Figure 8:
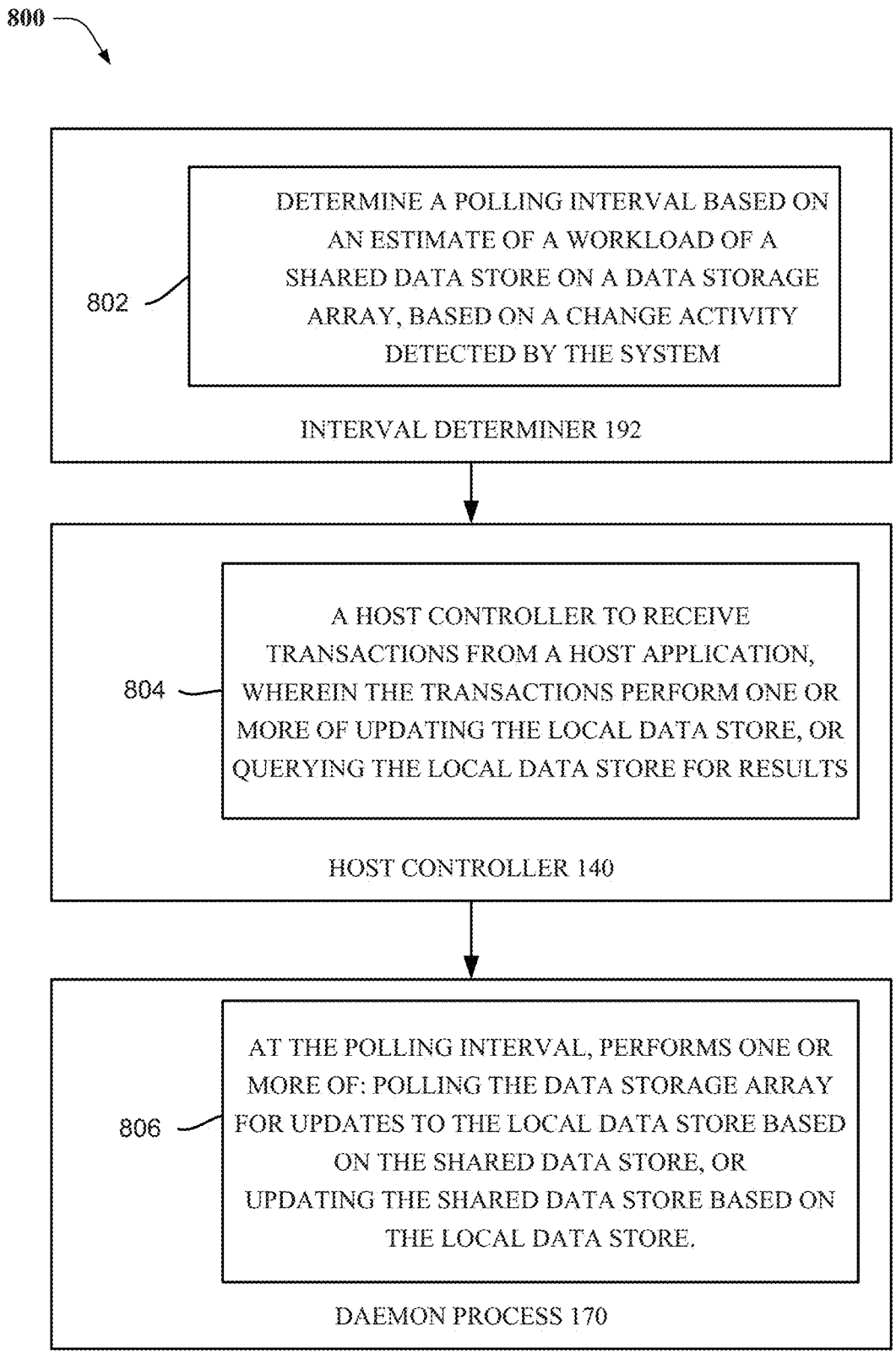
FIG. 8 is a flow diagram representing example operations for a method that can facilitate maintaining a consistent logical data size with variable protection stripe size in an array of independent disks system, in accordance with various aspects and implementations of the subject disclosure.

FIG. 8 is a flow diagram representing example operations of system comprising interval determiner 192, host controller 140, and daemon process 170, in accordance with one or more embodiments. For purposes of brevity, description of like elements and/or processes employed in other embodiments is omitted.

Interval determiner 192 can be configured to determine a polling interval based on an estimate of a workload of a shared data store on a data storage array, based on a change activity detected by the system.

Host controller 140 can be configured to receive transactions from a host application, wherein the transactions perform one or more of updating the local data store, or querying the local data store for results. Daemon process 170 can be configured to, at the polling interval, perform one or more of: polling the data storage array for updates to the local data store based on the shared data store, or updating the shared data store based on the local data store.

Figure 9:
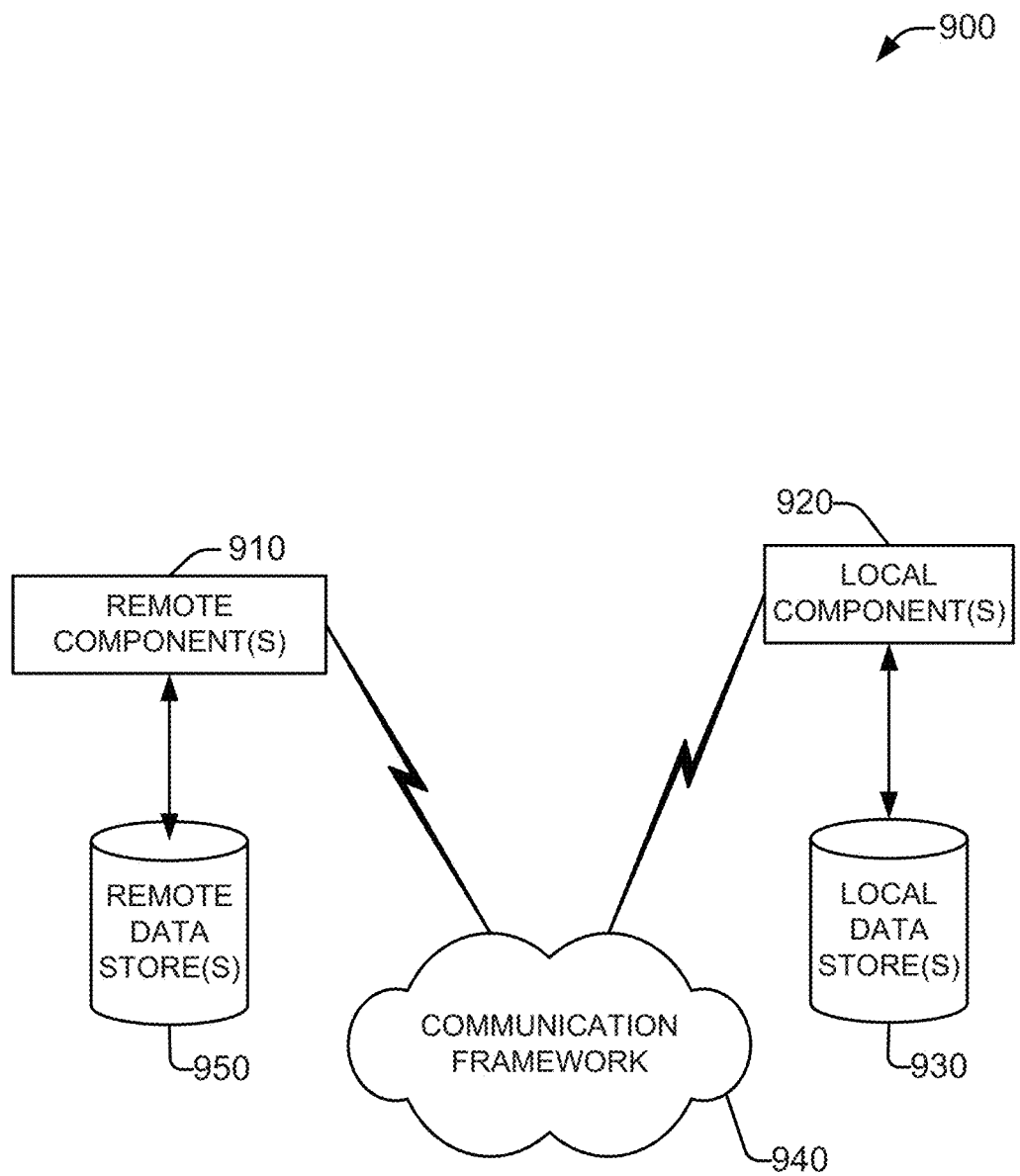
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a size changer (e.g., size changer 92) and a predictor (e.g., predictor 94) and/or programs that communicate/use the remote resources 99 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
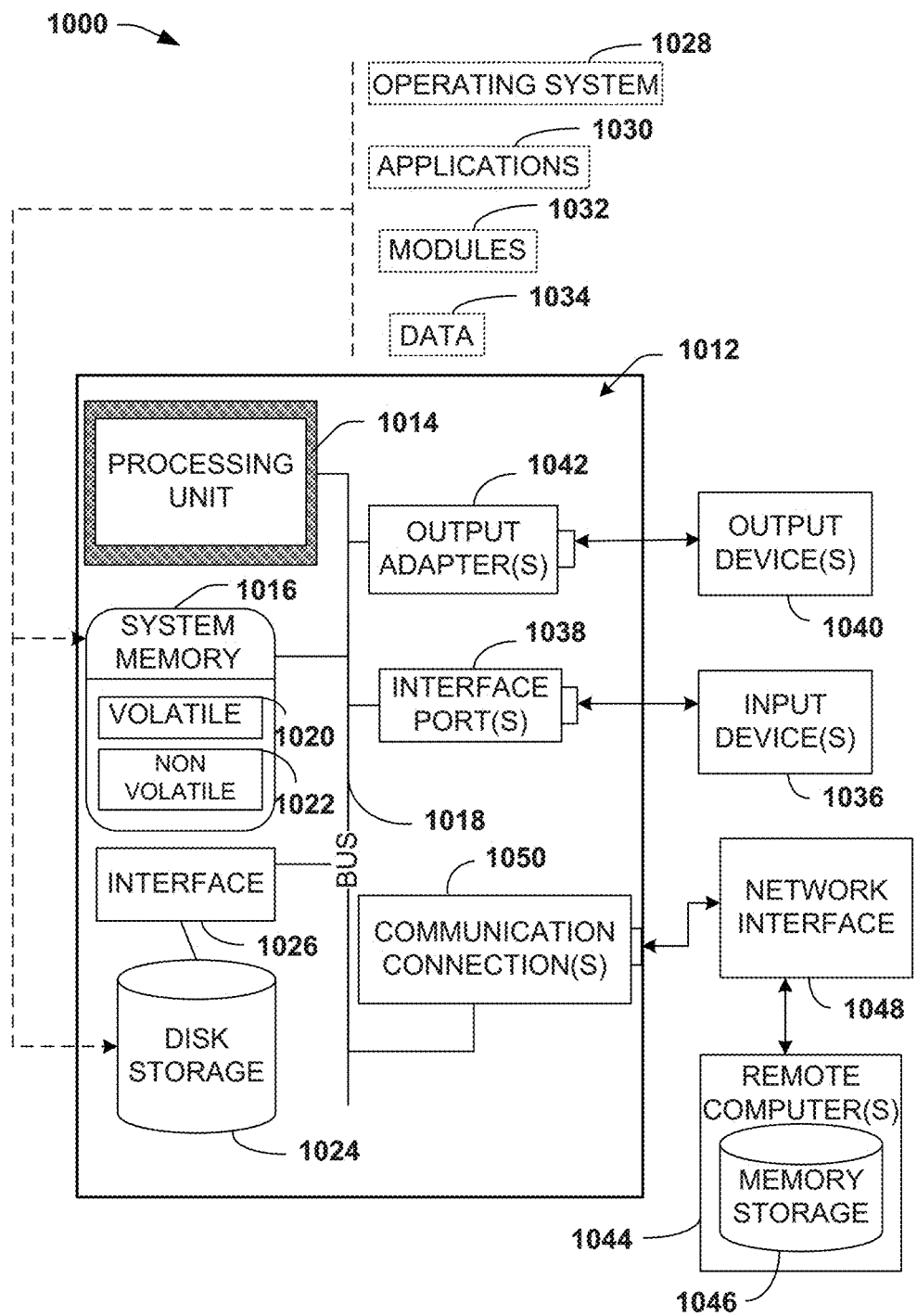
FIG. 10 illustrates an example block diagram of a computing system operable to execute the disclosed systems.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a memory that stores computer executable components; and
   a processor that executes the computer executable components stored in the memory, wherein the computer executable components comprise:
   an interval determiner to determine a polling interval based on an estimate of a workload of a shared data store on a data storage array, based on a change activity detected by the system, wherein the change activity detected by the system comprises a rate of change of a size of a local data store in comparison to a first threshold;
   a host controller to receive transactions from a host application, wherein the transactions perform one or more of updating the local data store, or querying the local data store for results; and
   a daemon process that, at the polling interval, performs one or more of:
   polling the data storage array for updates to the local data store based on the shared data store, or
   updating the shared data store based on the local data store.

2. The system of claim 1, wherein the change activity detected by the system further comprises a number of transactions received from the host application in comparison to a second threshold.

3. The system of claim 1, wherein the host controller further receives transactions from one or more additional host applications, and wherein the change activity detected by the system further comprises a change in a total number of host applications from which transactions are received in comparison to a second threshold.

4. The system of claim 1, wherein the daemon process measures a time for response from the data storage array for the polling for updates to the local data store and the updating the shared data store based on the local data store, and wherein the change activity detected by the system further comprises the time for response in comparison to a second threshold.

5. The system of claim 1, wherein the change activity detected by the system further comprises an error in one or more of, the polling the data storage array for updates and the updating the shared data store based on the local data store, and wherein the change activity detected by the system further comprises a second of errors detected in comparison to a second threshold.

6. The system of claim 5, wherein the interval determiner further determines a pause interval based on the polling interval, and wherein upon detection of the error, the system reduces activity based on the pause interval.

7. The system of claim 1, wherein the data storage array comprises a group name server.

8. A computer-implemented method, comprising:
updating, by a data storage array comprising a processor, a shared data store, based on an update request received from a management host device;
receiving, by the data storage array, a polling request from the management host device, wherein the polling request is received at a polling interval determined by the management host device based on an estimate, by the management host device, of a workload of the shared data store, wherein the estimate of the workload of the shared data store is based on a change activity detected by the management host device, wherein the change activity detected by the host management device comprises a rate of change of a size of a local data store in comparison to a first threshold; and
responding, by the data storage array, to the polling request.

9. The computer-implemented method of claim 8, wherein the change activity detected by the system further comprises a number of transactions received from host application in comparison to a second threshold.

10. The computer-implemented method of claim 8, wherein host controller further receives transactions from one or more additional host applications, and wherein the change activity detected by the system further comprises a change in a total number of host applications from which transactions are received in comparison to a second threshold.

11. The computer-implemented method of claim 8, wherein the daemon process further measures a time for response from the data storage array for the polling for updates to the local data store and the updating the shared data store based on the local data store, and wherein the change activity detected by the system further comprises the time for response in comparison to a second threshold.

12. The computer-implemented method of claim 8, wherein the change activity detected by the system further comprises an error in one or more of, the polling the data storage device for updates and the updating the shared data store based on the data storage array.

13. The computer-implemented method of claim 12, wherein the interval determiner further determines a pause interval based on the polling interval, and wherein upon detection of the error, the system reduces activity based on the pause interval.

14. A non-transitory machine-readable medium, comprising executable instructions that, when executed by a processor of a network device, facilitate performance of operations, comprising:
determining a polling interval based on an estimate of a workload of a shared data store on a data storage array, based on a change activity detected by the system, wherein the change activity comprises a rate of change of a size of a local data store in comparison to a first threshold;
receiving transactions from a host application, wherein the transactions perform one or more of updating the local data store, or querying the local data store for results; and
performing, by a daemon process at the polling interval, one or more of:
polling the data storage array for updates to the local data store based on the shared data store, or
updating the shared data store based on the local data store.

15. The non-transitory machine-readable medium of claim 14, wherein the change activity further comprises a number of transactions received from the host application in comparison to a second threshold.

16. The non-transitory machine-readable medium of claim 14, wherein the change activity further comprises a number of transactions received from the host application in comparison to a second threshold.

17. The non-transitory machine-readable storage medium of claim 14, wherein the change activity further comprises a number of transactions received from a host application in comparison to a second threshold.

18. The non-transitory machine-readable medium of claim 14, wherein the daemon process further measures a time for response from the data storage array for the polling for updates to the local data store and the updating the shared data store based on the local data store, and wherein the change activity detected by the system further comprises the time for response in comparison to a second threshold.

19. The non-transitory machine-readable medium of claim 14, wherein the change activity further comprises an error.

20. The non-transitory machine-readable medium of claim 19, wherein the operations further comprise:
determining, by an interval determiner, a pause interval based on the polling interval, wherein, upon detection of the error, the system reduces activity based on the pause interval.

* * * * *